United States Patent
Tachiki (10) Patent No.: US 11,353,378 B2
(45) Date of Patent: Jun. 7, 2022

(54) MACHINING DEVICE AND BRAKE INSPECTION METHOD THEREFOR

(71) Applicant: FANUC CORPORATION, Yamanashi (JP)

(72) Inventor: Shingo Tachiki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 62 days.

(21) Appl. No.: 17/066,716

(22) Filed: Oct. 9, 2020

(65) Prior Publication Data

US 2021/0116328 A1 Apr. 22, 2021

(30) Foreign Application Priority Data

Oct. 18, 2019 (JP) .............................. JP2019191040

(51) Int. Cl.
*G01L 5/28* (2006.01)
*G01M 13/00* (2019.01)

(52) U.S. Cl.
CPC ............... *G01M 13/00* (2013.01); *G01L 5/28* (2013.01)

(58) Field of Classification Search
CPC ................................ G01L 5/28; G01M 13/00
See application file for complete search history.

(56) References Cited

U.S. PATENT DOCUMENTS

| | | | | |
|---|---|---|---|---|
| 2007/0000735 A1* | 1/2007 | Hanninen | ............... | G01L 5/288 187/391 |
| 2012/0209481 A1* | 8/2012 | Rindfleisch | ........... | B60W 10/06 701/54 |
| 2012/0217100 A1* | 8/2012 | Spirgi | ................... | B66B 5/0025 187/393 |
| 2014/0035213 A1* | 2/2014 | Zheng | .................... | B23Q 16/02 269/57 |
| 2015/0360337 A1* | 12/2015 | Nishimura | ......... | G05B 19/4155 269/57 |
| 2017/0108071 A1* | 4/2017 | Saito | ..................... | F16D 66/022 |
| 2017/0299452 A1* | 10/2017 | Yasuda | ..................... | G01L 5/28 |
| 2018/0134517 A1* | 5/2018 | Zhou | ........................ | B66B 1/32 |
| 2019/0017890 A1* | 1/2019 | Ono | ........................ | G01L 3/00 |

(Continued)

FOREIGN PATENT DOCUMENTS

| | | |
|---|---|---|
| EP | 2106878 A1 | 10/2009 |
| JP | 2009248242 A | 10/2009 |

(Continued)

*Primary Examiner* — Eric S. McCall (74) *Attorney, Agent, or Firm* — Karceski IP Law, PLLC (57) ABSTRACT

A machining device includes a driving shaft provided with a brake and driven by a motor, a detector that detects a state quantity of the driving shaft, and a controller that controls the driving shaft based on the state quantity. The controller includes a switch command unit that outputs a switch command for switching the brake between on and off states, a vibration command unit that outputs a vibration command for rotating the motor minutely in forward and reverse directions at a first time point after the switch command is output and at a second time point temporally spaced at an interval from the first time point, and a determination unit that determines a state of the brake based on the state quantity detected at the first time point while the vibration command is being output and the state quantity at the second time point.

20 Claims, 6 Drawing Sheets

(56) References Cited

U.S. PATENT DOCUMENTS

| | | | |
|---|---|---|---|
| 2020/0319045 A1* | 10/2020 | Kobayashi | G01L 5/28 |
| 2021/0116328 A1* | 4/2021 | Tachiki | G01M 7/00 |
| 2021/0269034 A1* | 9/2021 | Hirose | G01L 5/28 |
| 2021/0318197 A1* | 10/2021 | Cazzulani | G01M 99/007 |
| 2021/0325269 A1* | 10/2021 | Yassan | G01L 5/28 |

FOREIGN PATENT DOCUMENTS

| | | |
|---|---|---|
| JP | 4422187 B2 | 2/2010 |
| JP | 2012198734 A | 10/2012 |
| JP | 2014030864 A | 2/2014 |
| JP | 2016002613 A | 1/2016 |

\* cited by examiner

MACHINING DEVICE AND BRAKE INSPECTION METHOD THEREFOR

CROSS-REFERENCE TO RELATED APPLICATIONS

This application is based on and claims priority to Japanese Patent Application No. 2019-191040, filed on Oct. 18, 2019, the entire contents of which are incorporated herein by reference.

FIELD OF THE INVENTION

The present invention relates to machining devices and brake inspection methods therefor.

BACKGROUND OF THE INVENTION

A known rotating table is equipped with a brake for maintaining an index position (e.g., see The Publication of Japanese Patent No. 4422187).

With regard to this rotating table, it is determined whether or not the brake is in a clamped state by comparing the amplitude of oscillation with a threshold value when the rotating table is oscillated minutely by being rotated minutely in forward and reverse directions.

SUMMARY OF THE INVENTION

An aspect of the present invention provides a machining device including a driving shaft provided with a brake and driven by a motor, a detector that detects a state quantity of the driving shaft, and a controller that controls the driving shaft based on the state quantity detected by the detector. The controller includes a switch command unit that outputs a switch command for switching the brake between on and off states, a vibration command unit that outputs a vibration command for rotating the motor minutely in forward and reverse directions at a first time point after the switch command is output by the switch command unit and at a second time point temporally spaced at an interval from the first time point, and a determination unit that determines a state of the brake based on the state quantity detected at the first time point by the detector while the vibration command is being output by the vibration command unit and the state quantity at the second time point.

DESCRIPTION OF EMBODIMENT(S) OF THE INVENTION

A machining device 1 and a brake inspection method therefor according to an embodiment of the present invention will be described below with reference to the drawings.

Figure 1:
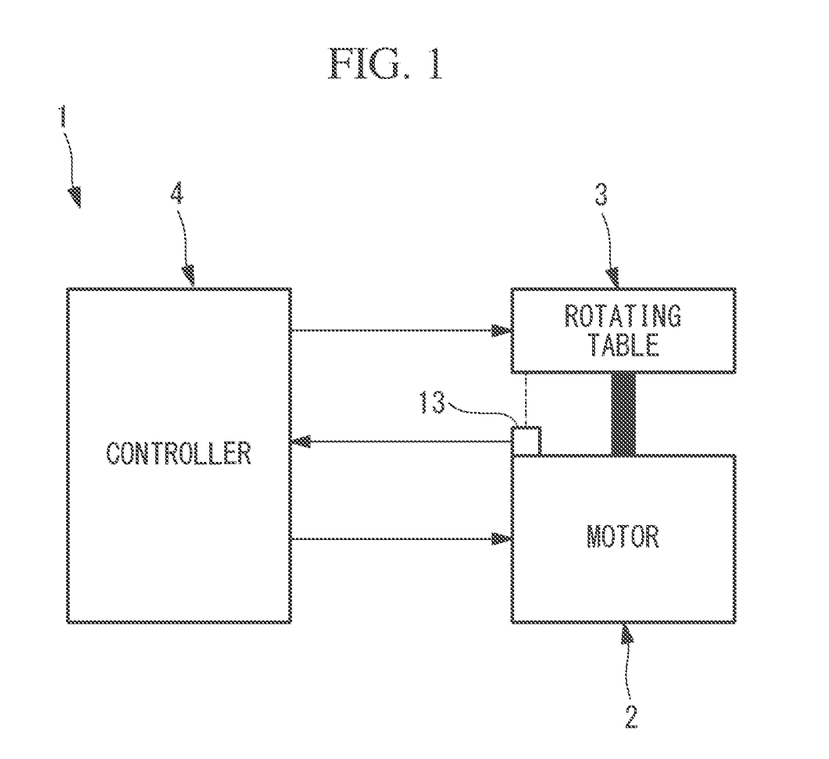
FIG. 1 illustrates the overall configuration of a machining device according to an embodiment of the present invention.

For example, as shown in FIG. 1, the machining device 1 according to this embodiment includes a rotating table (driving shaft) 3 driven by a motor 2 and a controller 4 that controls the rotating table 3.

Figure 2:
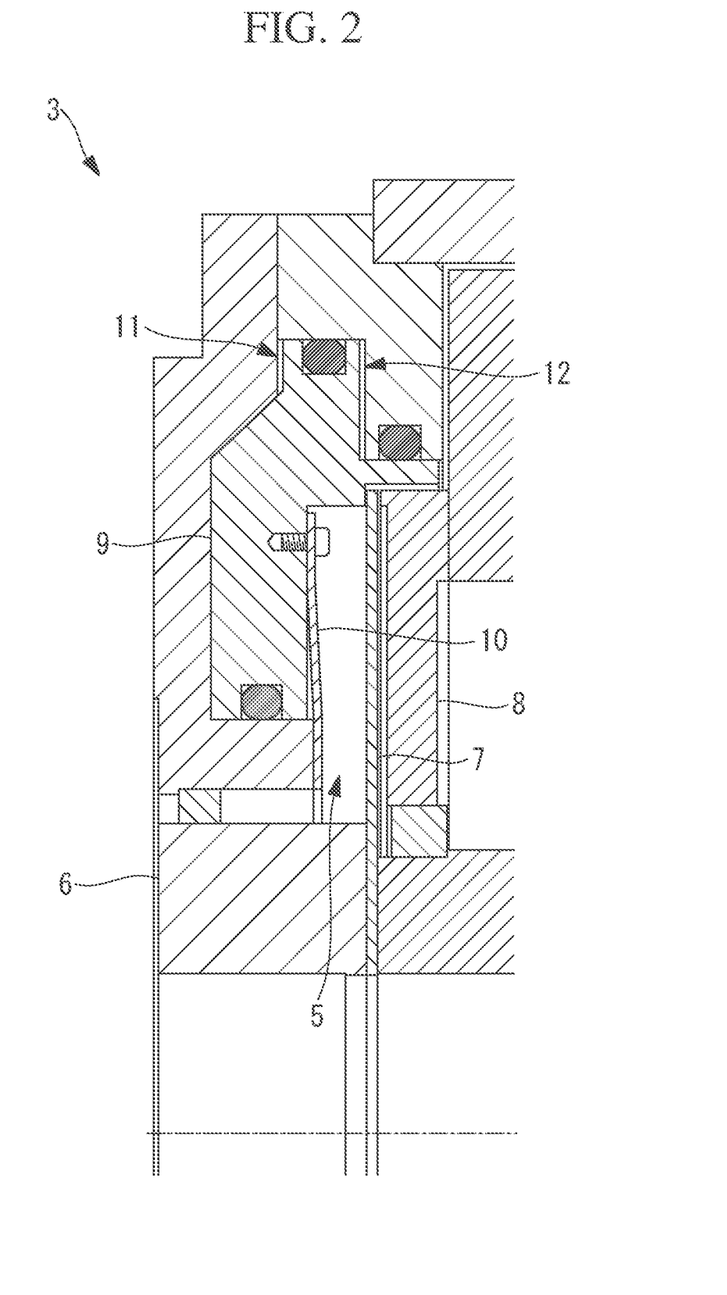
FIG. 2 is a partial vertical sectional view illustrating an example of the structure of a rotating table in FIG. 1.

As shown in FIG. 2, the rotating table 3 includes a brake 5. The brake 5 includes a brake disk 7 fixed to a main shaft 6 of the rotating table 3, a clamping member 8 disposed near the brake disk 7, and a piston 9 disposed opposite the clamping member 8 with the brake disk 7 clamped therebetween in the thickness direction. In FIG. 2, reference sign 10 denotes a plate spring that urges the piston 9 in the clamping direction.

The piston 9 is provided in such a manner as to be movable in the axial direction of the main shaft 6. A hermetically-sealed clamping chamber 11 and a hermetically-sealed unclamping chamber 12 are disposed at opposite sides of the piston 9 in the axial direction of the main shaft 6. When air is supplied into the clamping chamber 11, the piston 9 moves in one direction so that the brake disk 7 is clamped between the piston 9 and the clamping member 8, thereby setting the brake 5 to a brake-on state.

On the other hand, when air is applied into the unclamping chamber 12, the piston 9 moves in the reverse direction away from the brake disk 7, thereby setting the brake 5 to a brake-off state. When the supply of air to the clamping chamber 11 and the unclamping chamber 12 is stopped, the plate spring 10 urges the brake 5 in the clamping direction, thereby setting the brake 5 to the brake-on state.

A sensor (detector) 13 that detects a rotational angle (state quantity) of the rotating table 3 is provided between the motor 2 and the rotating table 3. The sensor 13 is, for example, a noncontact encoder.

Figure 3:
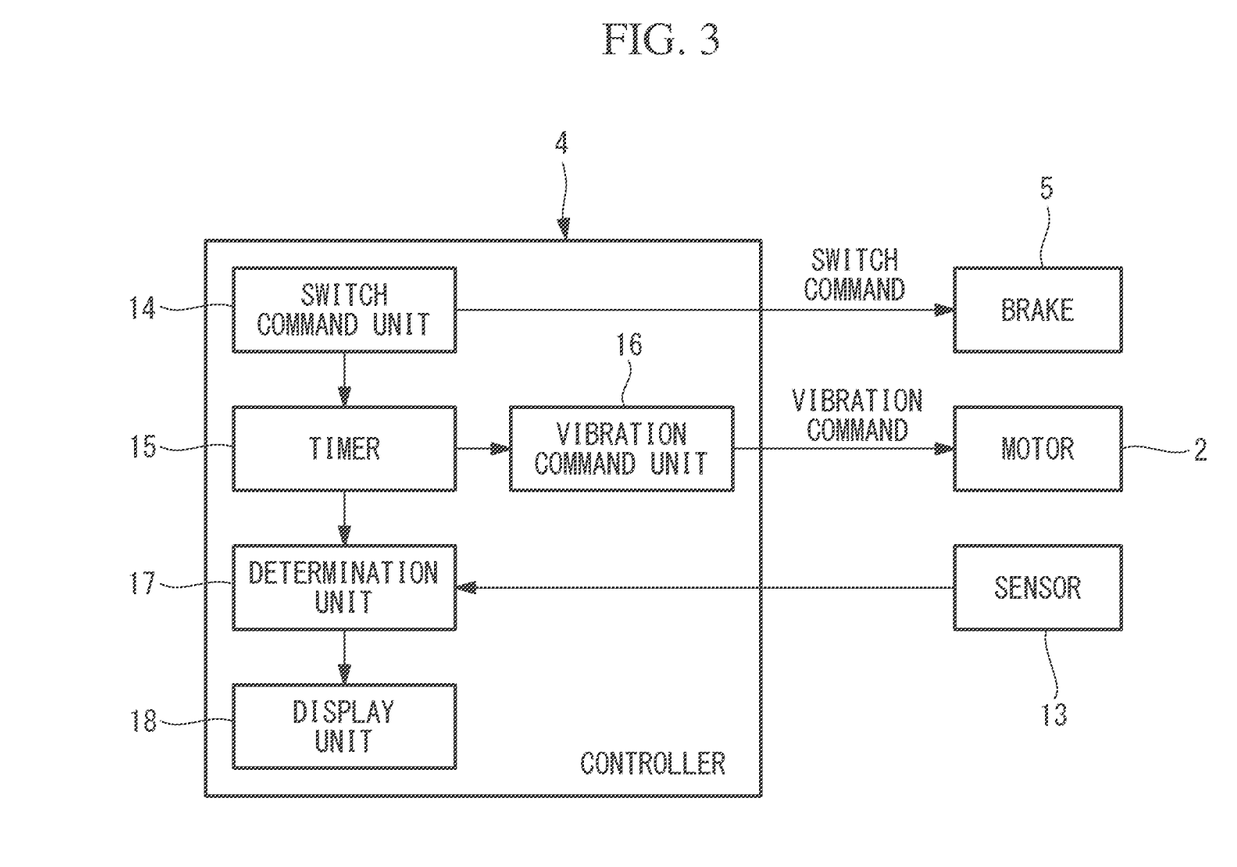
FIG. 3 is a block diagram illustrating a controller included in the machining device in FIG. 1.

As shown in FIG. 3, the controller 4 includes a switch command unit 14, a timer 15, a vibration command unit 16, a determination unit 17, and a display unit 18. The switch command unit 14, the vibration command unit 16, and the determination unit 17 are constituted by a processor and a memory. The display unit 18 is a monitor.

The switch command unit 14 outputs a switch command for switching between on and off states to the brake 5 of the rotating table 3. The timer 15 starts performing a time measuring process from the point at which the switch command is output.

The vibration command unit 16 outputs a vibration command to the motor 2 at two time points measured by the timer 15, namely, a first time point T1 and a second time point T2. A vibration command is, for example, a micro-amplitude sine wave of one period. When a vibration command is input, the motor 2 is rotated minutely in forward and reverse directions.

Information about the rotational angle of the rotating table 3 detected by the sensor 13 is transmitted to the determination unit 17 where various determination processes are performed. The determination results are displayed on the display unit 18.

Next, a brake inspection method for the machining device 1 according to an embodiment of the present invention will be described below.

Figure 4:
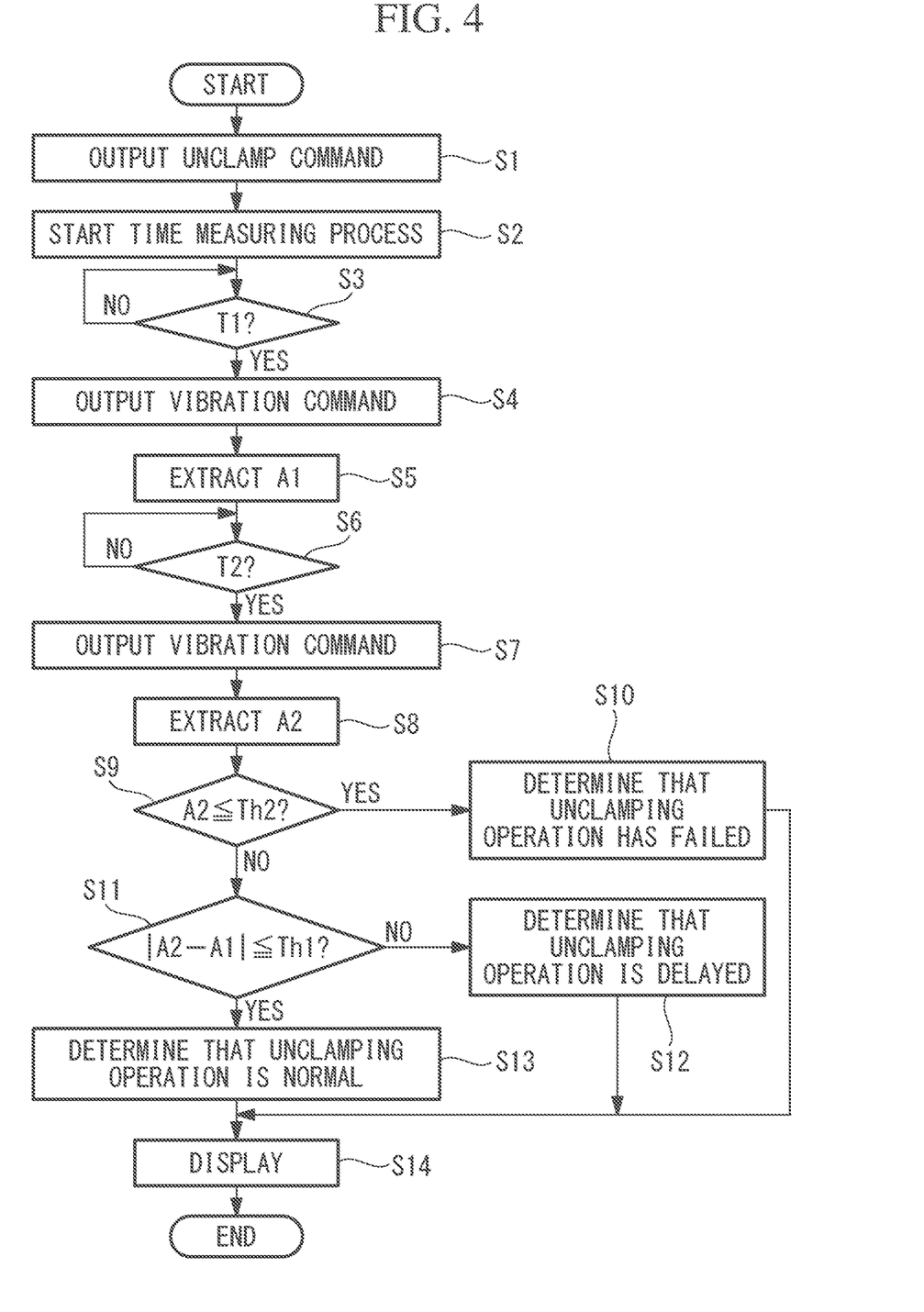
FIG. 4 is a flowchart illustrating a brake inspection method for the machining device in FIG. 1.

First, as shown in FIG. 4, the brake inspection method according to this embodiment involves outputting a switch signal to the brake 5 of the rotating table 3 from the switch command unit 14 (step S1). The following description relates to a case where the switch command unit 14 outputs an unclamp command as a switch command to the brake 5 of the rotating table 3.

The switch command unit 14 transmits an activation command to the timer 15 at the same time as the output of the switch signal, and the timer 15 starts performing a time measuring process (step S2). The time measurement result obtained by the timer 15 is transmitted to the vibration command unit 16 and the determination unit 17.

When the time measurement result obtained by the timer 15 indicates that the first time point T1 is reached, the vibration command unit 16 outputs a vibration command to the motor 2 so as to cause the motor 2 to vibrate minutely (step S3 and step S4).

During the vibration at the first time point T1, the determination unit 17 extracts an amplitude A1 of the vibration of the rotating table 3 from information about the rotational angle of the rotating table 3 transmitted from the sensor 13, and stores the amplitude A1 (step S5).

Subsequently, when the time measurement result obtained by the timer 15 indicates that the second time point T2, which is temporally spaced at an interval from the first time point T1, is reached, the vibration command unit 16 outputs a vibration command to the motor 2 so as to cause the motor 2 to vibrate minutely (step S6 and step S7).

During the vibration at the second time point T2, the determination unit 17 extracts an amplitude A2 of the vibration of the rotating table 3 from information about the rotational angle of the rotating table 3 transmitted from the sensor 13, and stores the amplitude A2 (step S8).

In this state, the determination unit 17 determines whether or not the amplitude A2 extracted at the second time point T2 is smaller than or equal to a predetermined second threshold value Th2 (step S9). If the determination result indicates that the amplitude A2 is smaller than or equal to the second threshold value Th2, the determination unit 17 determines that the unclamping operation has failed (step S10), and displays the result on the display unit 18 (step S14).

If the amplitude A2 is larger than the predetermined second threshold value Th2, the determination unit 17 determines whether or not an absolute value of the difference between the amplitude A1 at the first time point T1 and the amplitude A2 at the second time point T2 is smaller than or equal to a predetermined first threshold value Th1 (step S11). If the determination result indicates that the absolute value of the difference |A2−A1| is larger than the first threshold value Th1, the determination unit 17 determines that there is a delay in the unclamping operation (step S12), and displays the result on the display unit 18 (step S14).

In contrast, if the determination result obtained by the determination unit 17 indicates that the absolute value of the difference |A2−A1| is smaller than or equal to the first threshold value Th1, the determination unit 17 determines that the unclamping operation is normal (step S13), and displays the result on the display unit 18 (step S14).

Accordingly, in the machining device 1 and the brake inspection method therefor according to this embodiment, it is determined whether the unclamping operation is normal or abnormal based on the vibration amplitude of the rotating table 3 during the vibration thereof at the first time point T1 and the second time point T2 that are temporally spaced at an interval from each other. Accordingly, this is advantageous in that the state of the brake 5 can be determined accurately regardless of the inertia of a workpiece, as compared with a case where the determination is performed in a single vibration process.

Figure 5:
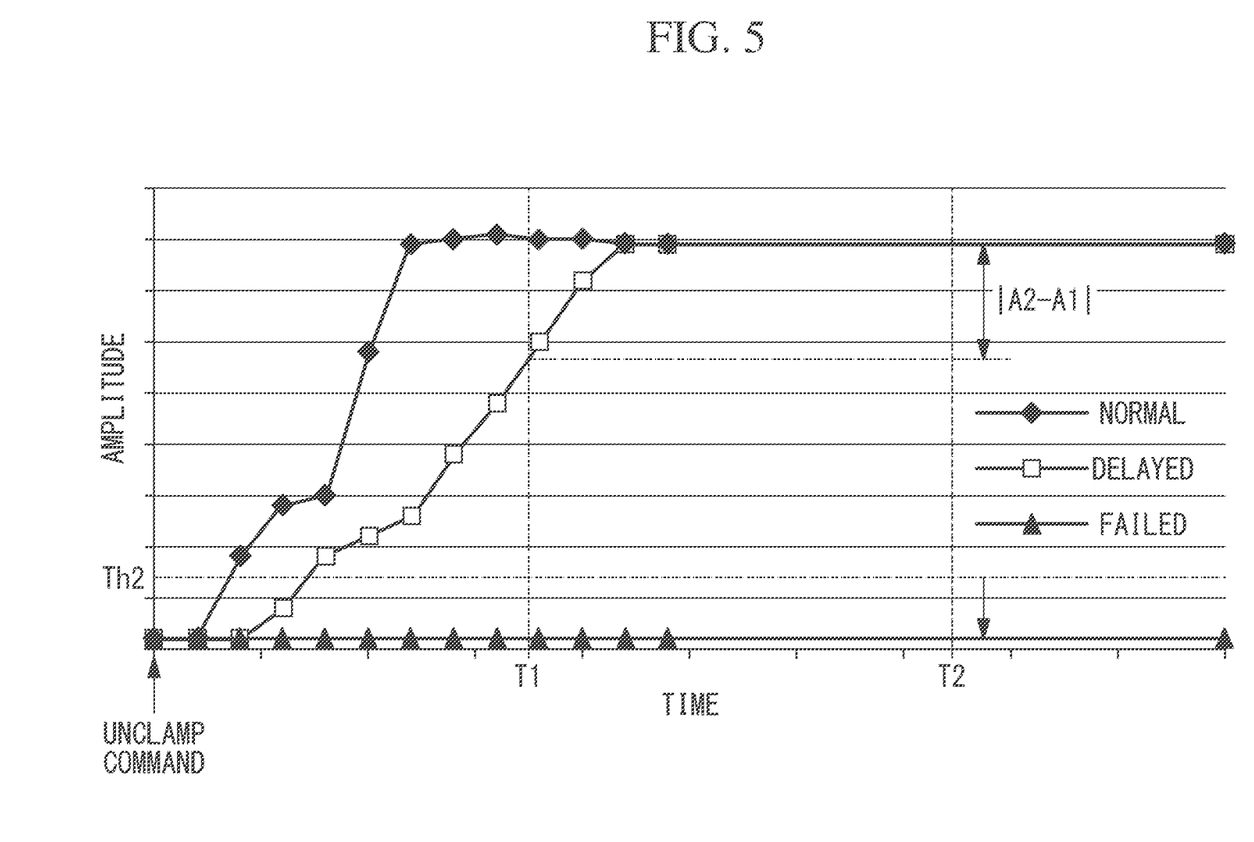
FIG. 5 is a graph illustrating the determination of an unclamping operation in the brake inspection method for the machining device in FIG. 1.

Specifically, as shown in FIG. 5, after a command for an unclamping operation is given, the motor 2 is vibrated twice with a time interval therebetween. If the amplitude A2 of the second vibration is small, it can be determined that the unclamping operation has not been performed (i.e., the unclamping operation has failed).

If the amplitude A2 of the second vibration is large, it can be determined that the unclamping operation is performed at the second time point, but if the amplitude A1 of the first vibration is small, it can be determined that the unclamping operation is performed in a delayed manner.

If the amplitude A1 of the first vibration and the amplitude A2 of the second vibration are substantially equal to each other (i.e., if the first threshold value Th1 is sufficiently small) and are sufficiently small, it can be determined that the unclamping operation is normal.

In the machining device 1 and the brake inspection method therefor according to this embodiment, vibration commands are output twice to the motor 2, and the unclamping operation is determined as being normal or abnormal by using the amplitude A1 and the amplitude A2 of the rotating table 3 during the vibration. Alternatively, the vibration commands may be output two or more times.

In this case, temporal changes in the unclamped state of the brake 5 of the rotating table 3 can be checked in more detail.

In this case, if it is to be determined that the unclamping operation has failed or is delayed at the two initially-set time points T1 and T2, an amplitude detection time point for the determination may be searched for within a permissible range of the determination period. Specifically, the determination process is permitted at a time point later than the two initially-set time points T1 and T2, and if it can be determined that the unclamping operation is normal, the time points T1 and T2 may be extended.

As an alternative to this embodiment in which the switch command unit 14 outputs an unclamp command as a switch command to the brake 5 of the rotating table 3, the switch command unit 14 may output a clamp command.

Figure 6:
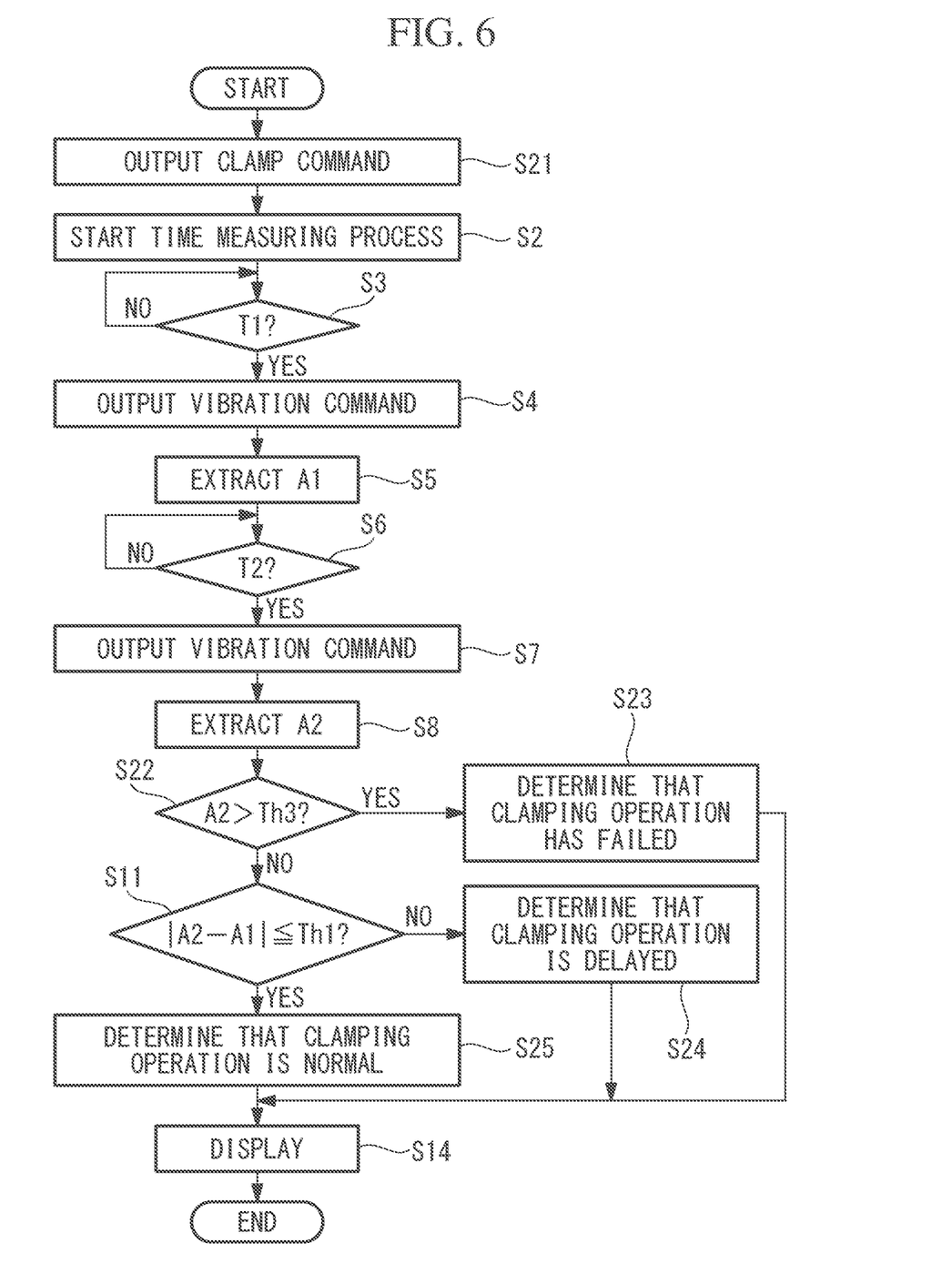
FIG. 6 is a flowchart illustrating a modification of the brake inspection method for the machining device in FIG. 1.

In this case, as shown in FIG. 6, a clamp command is output (step S21).

Then, it is determined whether or not the amplitude A2 extracted at the second time point T2 is larger than a third threshold value Th3 (step S22). If the amplitude A2 is larger than the third threshold value Th3, it is determined that the clamping operation has failed (step S23). If the amplitude A2 is smaller than or equal to the third threshold value Th3 and the absolute value of the difference between the amplitude A2 and the amplitude A1 is larger than the first threshold value Th1, it is determined that there is a delay in the clamping operation (step S24). If the amplitude A2 is smaller than or equal to the third threshold value Th3 and the absolute value of the difference between the amplitude A2 and the amplitude A1 is smaller than or equal to the first threshold value Th1, it may be determined that the clamping operation is normal (step S25).

As an alternative to this embodiment in which the rotating table 3 is described as an example of a driving shaft of the machining device 1, another freely-chosen driving shaft may be used so long as the driving shaft is equipped with the brake 5.

The rotational angle (i.e., displacement amount) of the rotating table 3 is described as an example of a state quantity to be detected. Alternatively, another state quantity, such as torque, acceleration, or speed, may be detected. The torque may be detected using a current value of the motor 2 or by using a torque sensor. The speed may be calculated by differentiating the rotational angle or the displacement amount.

In the case of the rotating table 3, the determination result varies depending on the rotational angle position if the weight of the mounted workpiece is not balanced out. Thus, an operation for reducing the effect of the weight balance of the workpiece may be performed before an unclamp command or a clamp command is output.

For example, the current value of the motor 2 may be recorded while the rotating table 3 is rotated once, and the brake inspection may be performed after the rotating table 3 is stopped at a rotational angle position where the current value reaches its minimum.

The brake inspection may be executed by incorporating an inspection-dedicated command code at the beginning or the end of a machining program, or may be executed when the number of times the clamping operation or the unclamping operation is performed reaches a predetermined value. Alternatively, the brake inspection may be performed when needed.

The invention claimed is:

1. A machining device comprising:
   a driving shaft provided with a brake and driven by a motor;
   a detector that detects a state quantity of the driving shaft; and
   a controller that controls the driving shaft based on the state quantity detected by the detector,
   wherein the controller includes
   a switch command unit that outputs a switch command for switching the brake between on and off states,
   a vibration command unit that outputs a vibration command for rotating the motor minutely in forward and reverse directions at a first time point after the switch command is output by the switch command unit and at a second time point temporally spaced at an interval from the first time point, and
   a determination unit that determines a state of the brake based on the state quantity detected at the first time point by the detector while the vibration command is being output by the vibration command unit and the state quantity at the second time point.

2. The machining device according to claim 1, wherein the determination unit determines that operation of the brake is delayed if an absolute value of a difference between the state quantity at the second time point and the state quantity at the first time point is larger than a first threshold value.

3. The machining device according to claim 1, wherein the switch command unit outputs an unclamp command as the switch command, and
   wherein the determination unit determines that an unclamping operation of the brake has failed if the state quantity at the second time point is smaller than or equal to a second threshold value.

4. The machining device according to claim 3, wherein the determination unit determines that the unclamping operation of the brake is normal when the state quantity at the first time point and the state quantity at the second time point are both larger than the second threshold value and the state quantity at the first time point and the state quantity at the second time point are substantially equal to each other.

5. The machining device according to claim 1, wherein the switch command unit outputs a clamp command as the switch command, and
   wherein the determination unit determines that a clamping operation of the brake has failed if the state quantity at the second time point is larger than a third threshold value.

6. The machining device according to claim 5, wherein the determination unit determines that the clamping operation of the brake is normal when the state quantity at the first time point and the state quantity at the second time point are both smaller than or equal to the third threshold value and the state quantity at the first time point and the state quantity at the second time point are substantially equal to each other.

7. The machining device according to claim 1, wherein the driving shaft is a rotating table.

8. The machining device according to claim 1, wherein the state quantity is displacement, speed, or acceleration.

9. The machining device according to claim 1, wherein the vibration command unit outputs an additional vibration command one or more times between the first time point and the second time point, and
   wherein the determination unit determines a change in the state of the brake based on the state quantities with respect to the vibration command at the first time point, the vibration command at the second time point, and the additional vibration command.

10. A brake inspection method for a machining device equipped with a driving shaft having a brake, the brake inspection method comprising:
    outputting a switch command for switching a state of the brake;
    outputting a vibration command to the driving shaft at a first time point after the switch command is output and at a second time point temporally spaced at an interval from the first time point;
    detecting a state quantity of the driving shaft during output of each vibration command; and
    determining the state of the brake based on the detected state quantity at the first time point and the detected state quantity at the second time point.

11. The brake inspection method according to claim 10, further comprising:
    determining that operation of the brake is delayed if an absolute value of a difference between the state quantity at the second time point and the state quantity at the first time point is larger than a first threshold value.

12. The brake inspection method according to claim 11, further comprising:
    delaying one of or each of the first time point and the second time point within a predetermined permissible time range if the operation of the brake is determined as being delayed.

13. The brake inspection method according to claim 10, further comprising:
    outputting an unclamp command as the switch command; and
    determining that an unclamping operation of the brake has failed if the state quantity at the second time point is smaller than or equal to a second threshold value.

14. The brake inspection method according to claim 13, further comprising:
    determining that the unclamping operation of the brake is normal when the state quantity at the first time point and the state quantity at the second time point are both larger than the second threshold value and the state quantity at the first time point and the state quantity at the second time point are substantially equal to each other.

15. The brake inspection method according to claim 10, further comprising:
    outputting a clamp command as the switch command; and determining that a clamping operation of the brake has failed if the state quantity at the second time point is larger than a third threshold value.

16. The brake inspection method according to claim 15, further comprising:
determining that the clamping operation of the brake is normal when the state quantity at the first time point and the state quantity at the second time point are both smaller than or equal to the third threshold value and the state quantity at the first time point and the state quantity at the second time point are substantially equal to each other.

17. The brake inspection method according to claim 10, wherein the driving shaft is a rotating table.

18. The brake inspection method according to claim 17, further comprising:
causing the driving shaft to perform operation for reducing unbalanced torque before the vibration command is output.

19. The brake inspection method according to claim 18, further comprising:
moving the driving shaft to a position where the unbalanced torque decreases.

20. The brake inspection method according to claim 10, wherein the state quantity is displacement, speed, or acceleration.

* * * * *